(No Model.)  2 Sheets—Sheet 1.
G. C. JANNEY.
CORN PLANTER.
No. 535,700. Patented Mar. 12, 1895.
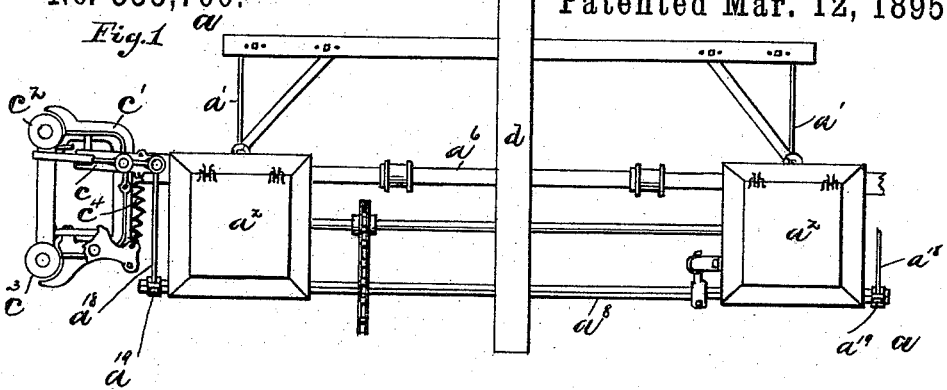
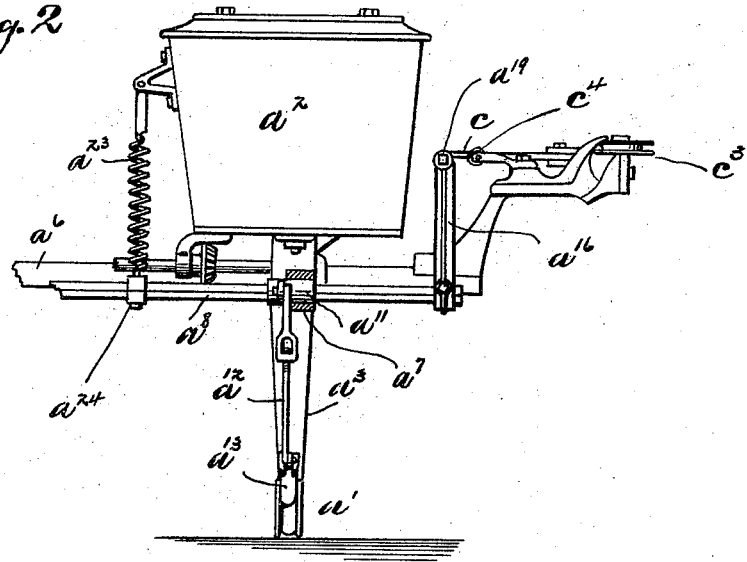
WITNESSES:
Chas. I. Welch
James Fitch
INVENTOR
George C. Janney
BY Shirley Shephard
ATTORNEYS

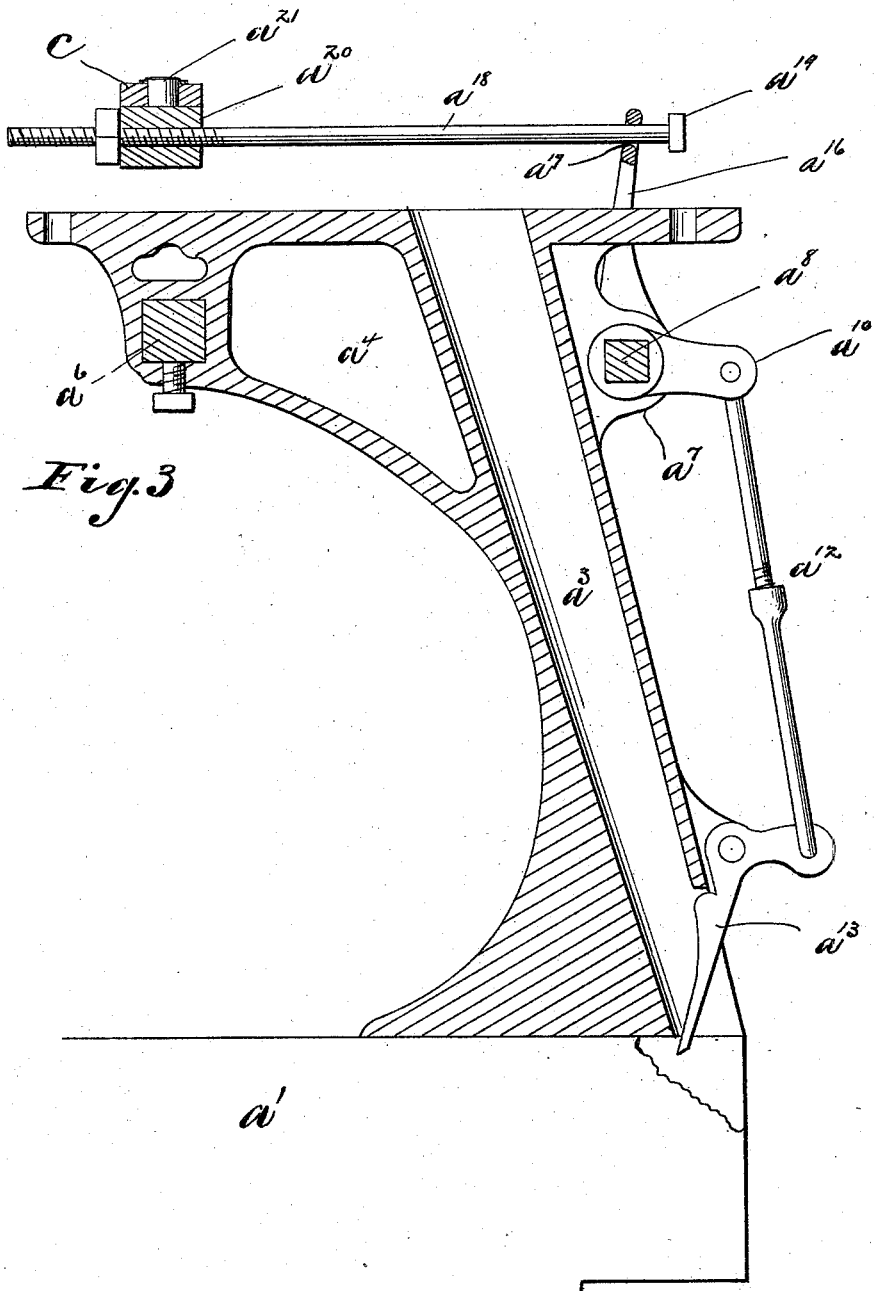

UNITED STATES PATENT OFFICE.

GEORGE C. JANNEY, OF MUNCIE, INDIANA, ASSIGNOR OF ONE-HALF TO THE H. P. DEUSCHER COMPANY, OF HAMILTON, OHIO.

CORN-PLANTER.

SPECIFICATION forming part of Letters Patent No. 535,700, dated March 12, 1895.

Original application filed June 17, 1893, Serial No. 477,903. Divided and this application filed September 22, 1894. Serial No. 523,797. (No model.)

*To all whom it may concern:*

Be it known that I, GEORGE C. JANNEY, a citizen of the United States, residing at Muncie, in the county of Delaware and State of Indiana, have invented certain new and useful Improvements in Corn-Planters, of which the following is a specification.

My invention relates to improvements in corn planters.

The object of my invention is to improve upon the constructions of corn planters now in use, with a view to simplifying the same, both in operation as well as construction, so as to increase the effectiveness of the machine as a completed machine and to decrease the cost of production; this application being a division of my pending application, Serial No. 477,903, filed June 17, 1893.

In the accompanying drawings, which form a part of this specification—Figure 1 is a plan view of the front part or runner frame of a corn planter embodying my invention. Fig. 2 is a rear view of a portion of the same. Fig. 3 is an enlarged detail of a portion of one of the planting shoes and the valve connections.

Like parts are represented by similar letters of reference in the several views.

In the said drawings, $a\ a$ represent the runner frame, which is adapted to be followed by a wheel frame hinged thereto in the usual manner. The runner frame is formed in the usual way with shoes $a'$ and seed boxes $a^2$ arranged above the shoes; seed tubes $a^3$ being employed in the usual manner for conducting the grain from the seed boxes to the shoes.

The seed tubes $a^3$ are preferably formed in a stand or bracket $a^4$, which is enlarged at the top to receive and support the seed boxes. These stands or brackets $a^4$ are each preferably provided at or near the top with a bearing $a^5$, formed integral therewith and formed with a square opening adapted to receive a connecting bar or shaft $a^6$, also formed square in cross-section. These stands or brackets are further provided in the rear with a bearing $a^7$, in which is journaled a shaft $a^8$ in the manner hereinafter more fully described. The cross bar $a^6$ extends from one bracket to the other, passing through the respective bearings therein and projecting outwardly in opposite directions therefrom. This bar furnishes the means of connecting the respective seed devices and also constitutes the support for the various operating parts and connections hereinafter more fully described. The shaft $a^8$ is also preferably formed square in cross-section, and has located thereon near each seed tube a projecting arm $a^{10}$, each of which is provided with an extended hub $a^{11}$, adapted to fit in the bearing $a^7$ and turn therein, thus furnishing journals for the square shaft $a^8$. From the respective arms $a^{10}$, a connecting link $a^{12}$ reaches to a pivoted valve $a^{13}$, arranged at or near the bottom of the seed tube $a^3$. The shaft $a^8$ is further provided at or near each end with a projecting arm or lever $a^{16}$, perforated near the top with an opening $a^{17}$ to receive a rod $a^{18}$, which extends through said opening. This rod $a^{18}$ is provided at one end with a head $a^{19}$ and screw-threaded at the opposite end so as to screw into a sleeve $a^{20}$; the said sleeve being provided with a projecting trunnion $a^{21}$, which is journaled in the bifurcated end of a pivoted fork lever $c$, arranged horizontally on a frame $c'$, which carries pulleys $c^2\ c^3$ for the knotted wire, and constitutes the ordinary check head adapted to be operated by the knotted wire in the usual manner.

A lock nut is preferably employed on the rod $a^{18}$ to hold said rod in different positions of adjustment through the sleeve $a^{20}$, as desired. The rod $a^{18}$ works loosely through the opening $a^{17}$; the head $a^{19}$ on said rod contacting with the arm $a^{16}$ when the rod is moved in one direction; the said arm being capable of an independent movement in relation to said rod in the other direction. A movement of the vibrating lever $c$ operates the rod $a^{18}$ and causes the head $a^{19}$ to contact with the arm $a^{16}$ and thus rocks the shaft $a^8$ so as to open the valve $a^{13}$. The valves, however, may close independently of the movement of the fork lever $c$, preferably by means of a spring $a^{23}$, attached to the shaft $a^8$ by means of a projecting arm $a^{24}$; said spring being connected at its opposite end to some convenient stationary part of the machine. The vibrating fork levers $c$ are returned to their normal positions after each stroke by a spring $c^4$ in the usual manner.

The arrangement, as described, for the connections from the vibrating fork levers to the valves $a^{13}$, permit said valves and the rock shaft to be moved independent of the vibrating fork levers when desired, without disconnecting the fork levers. This connection also permits either one of the vibrating levers $c$ to operate the valves independently of the other vibrating lever.

It will be seen from the above description that a simple and inexpensive construction is provided by which the operation of dropping the corn either by checking devices or by other means is provided.

Having thus described my invention, I claim—

1. The combination with a check head provided with a vibrating lever, said lever being vibrated in opposite directions by a spring connected thereto and by the knots of a check wire, of a rod reciprocated by said lever and provided with a stop, and a rock shaft oscillated axially by the stop and the spring, respectively, to open and close the check valves, substantially as specified.

2. The combination with the seed tube valves, and a rock shaft for operating the same, arms on said rock shaft having perforated ends, a rod provided with a head extending loosely through each of said arms, a screwthreaded sleeve on said rock shaft having a trunnion which projects through the end of a forked bifurcated lever supported horizontally in a check head, and springs for operating said rock shaft and forked lever, respectively, substantially as specified.

3. In a planter, the combination with a rock shaft, and valves adapted to open and close the seed tubes, and connections from said rock shaft to said valves, of a check head having a pivoted horizontally-arranged lever, a sleeve having a trunnion journaled in said lever, a screwthreaded rod screwed into said sleeve, an arm on said rock shaft having an opening through which said rod passes, a head on said rod, and a spring adapted to operate said rock shaft to close said valves, substantially as specified.

In testimony whereof I have hereunto set my hand this 19th day of September, A. D. 1894.

GEORGE C. JANNEY.

Witnesses:
JOHN C. JOHNSON,
ADDIE HATHAWAY.